(12) United States Patent
Comeau

(10) Patent No.: US 8,976,766 B2
(45) Date of Patent: Mar. 10, 2015

(54) INTEGRATED MICROWAVE BACKHAUL SUPPORT IN CELLULAR PRODUCTS

(75) Inventor: Adrien Joseph Comeau, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 611 days.

(21) Appl. No.: 13/313,611

(22) Filed: Dec. 7, 2011

(65) Prior Publication Data
US 2013/0148587 A1    Jun. 13, 2013

(51) Int. Cl.
H04W 4/00    (2009.01)
(52) U.S. Cl.
USPC ........................................................ 370/338
(58) Field of Classification Search
None
See application file for complete search history.

(56) References Cited

U.S. PATENT DOCUMENTS

| 2008/0049672 | A1 | 2/2008 | Barak et al. | |
|---|---|---|---|---|
| 2009/0029645 | A1* | 1/2009 | Leroudier | 455/7 |
| 2010/0272007 | A1* | 10/2010 | Shen et al. | 370/315 |
| 2011/0243060 | A1 | 10/2011 | Mildh et al. | |
| 2012/0155446 | A1* | 6/2012 | Machida | 370/338 |
| 2012/0281354 | A1* | 11/2012 | Rothkopf et al. | 361/679.48 |

FOREIGN PATENT DOCUMENTS

WO    2008007375 A2    1/2008

OTHER PUBLICATIONS

International Search Report and Written Opinion dated Jan. 21, 2013 for International Application No. PCT/IB2012/056027, International Filing Date, Oct. 30, 2012 consisting of 17-pages.

\* cited by examiner

*Primary Examiner* — Andrew Lai
*Assistant Examiner* — Leon Andrews
(74) *Attorney, Agent, or Firm* — Christopher & Weisberg, P.A.

(57) ABSTRACT

A method for integrating functions of a cellular radio controller and a microwave backhaul radio controller are disclosed. In some embodiments a cellular baseband unit is coupled to a cellular radio unit and a microwave backhaul radio unit. The cellular baseband unit includes a digital signal processor that performs modulation, demodulation and scheduling for both the cellular radio signals and the microwave backhaul radio signals.

20 Claims, 3 Drawing Sheets

INTEGRATED MICROWAVE BACKHAUL SUPPORT IN CELLULAR PRODUCTS

TECHNICAL FIELD

The present invention relates to wireless communications, and in particular to a method and system that combines functions of remote cellular equipment and microwave back haul equipment.

BACKGROUND

Cellular radio networks typically require a backhaul network connection from the base station to a telecommunications network over which user data and control information is transferred. Often, the connection between the base station and the telecommunications network is a wired connection. To ensure cost effectiveness, there is a high degree of integration and native support of the interface with the backhaul network device in the base station equipment. However, in many cases, due to availability, a wired connection is not used and a wireless microwave connection between the base station and the telecommunications network is used.

In these scenarios, the microwave backhaul link is provided by a stand alone product collocated with the cellular base station. With the planned increased density of long term evolution (LTE) deployments with small coverage area cells, there will become a significant need for increased microwave backhaul usage. Such arrangements are costly and inefficient from monitoring, space and power consumption perspectives.

Referring now to the drawing figures, in which like reference designators denote like elements, there is shown in FIG. 1 a diagram of a typical current configuration of a cellular base station 10 connected to microwave backhaul equipment 12 via a network connection 14. The microwave backhaul equipment 12 communicates with a telecommunications network (not shown) wirelessly via an antenna 16. Although not shown in FIG. 1, it is understood that complimentary microwave backhaul equipment is coupled to the telecommunications network to communicate with the antenna 16 to thereby provide a wireless microwave communication link from cellular base station 10 to the telecommunication network. The cellular base station communicates with mobile user equipment wirelessly via an antenna 18. In FIG. 1, while none of the functions of the microwave backhaul equipment and the cellular base station equipment are integrated, the microwave backhaul equipment and the cellular base station equipment are at a common location.

The presence of the microwave backhaul equipment at the cellular base station site creates issues of footprint and volume, power requirements, including backup facilities, cooling requirements, costs and operation and management issues. Remote radios reduce the amount of cellular base station equipment that remains indoors. This means that less space is needed for the indoor equipment. However, a lower limit on such space is imposed by the need for space occupied by the microwave backhaul equipment. Thus, configurations for which the cellular base station equipment and the microwave backhaul equipment are not integrated is becoming increasingly unattractive.

Therefore, there is a need for an arrangement that achieves a high level of integration between the cellular radio equipment with the microwave backhaul radio equipment.

SUMMARY

The present invention advantageously provides a method and system for integration of cellular radio and microwave backhaul functionality. According to one aspect, the invention provides a wireless communication system that includes a cellular radio unit, a microwave back haul radio unit, and a cellular baseband unit. The cellular radio unit is adapted to wirelessly communicate with a plurality of user units. The microwave backhaul radio is adapted to wirelessly communicate with a telecommunications network. The cellular baseband unit is communicatively coupled to the cellular radio unit and to the microwave backhaul radio unit. The cellular baseband unit includes a digital signal processor which provides a first layer modulation and demodulation of signals associated with the microwave backhaul unit and of signals associated with the cellular radio unit. The digital signal processor of the cellular baseband unit also provides a second layer scheduling for the microwave backhaul radio unit and for the cellular radio unit.

According to another aspect, the invention provides a cellular baseband unit that integrates cellular radio and microwave backhaul radio functions. The cellular baseband unit includes a first scheduler and a first modulator. The first scheduler schedules first signals to be transmitted by a cellular radio, and the first modulator modulates the first signals according to a first modulation scheme. The cellular baseband unit further includes a second scheduler and a second modulator. The second scheduler, operates in coordination with the first scheduler, and schedules second signals to be transmitted by a microwave backhaul radio. The second modulator modulates the second signals according to a second modulation scheme. The cellular baseband unit further includes a packet processor. The packet processor reformats the first signals from a first format of signals received from the microwave backhaul radio to a second format of signals transmitted by the cellular radio, and reformats the second signals from the second format to the first format.

According to another aspect, the invention provides a wireless communication method. The method includes scheduling, at a cellular baseband unit, first signals received from a cellular radio for transmission by a microwave backhaul radio. The method also includes scheduling, at the cellular baseband unit, second signals received from the microwave backhaul radio. The scheduling of the first signals and the scheduling of the second signals is coordinated to achieve a predetermined quality of service for both the first signals and the second signals.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
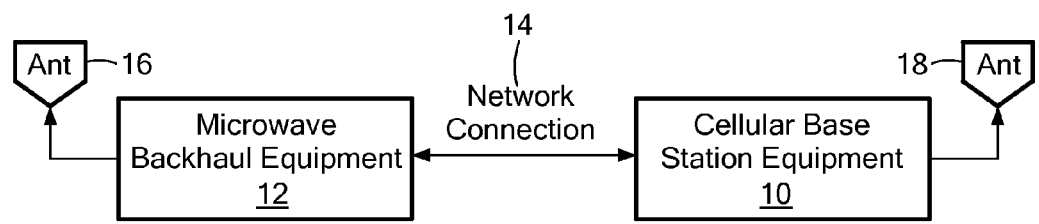
FIG. 1 is a diagram of a prior art configuration of a cellular base station connected to microwave backhaul equipment via a network connection.

Before describing in detail exemplary embodiments that are in accordance with the present invention, it is noted that the embodiments reside primarily in combinations of apparatus components and processing steps related to integration of cellular radio and microwave backhaul radio functionality at a base station in a wireless communication system. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 2:
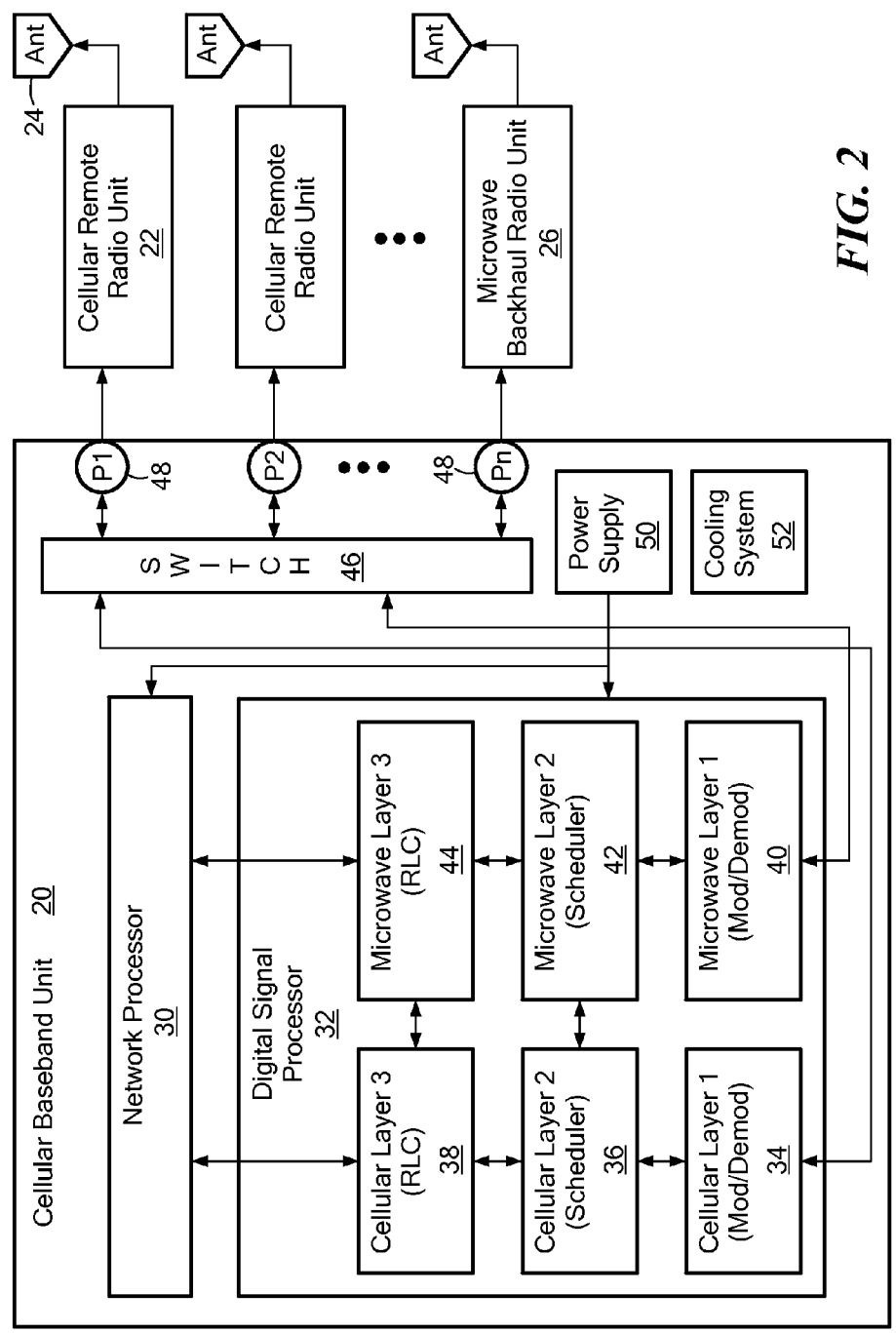
FIG. 2 is a diagram of a cellular baseband unit constructed in accordance with principles of the present invention.

FIG. 2 is a diagram of a cellular baseband unit 20 constructed in accordance with principles of the present invention. The cellular baseband unit 20 is communicatively coupled to one or more cellular radio units 22 which may be remote from the cellular baseband unit 20. A purpose of the cellular radio units 22 is to communicate via an antenna 24 with a plurality of user units which may include, for example, mobile phones. The cellular baseband unit 20 is also communicatively coupled to a microwave backhaul radio unit 26. A purpose of the microwave backhaul radio unit is to communicate with a telecommunications network via an antenna 28.

The cellular baseband unit 20 includes a network processor 30 and a digital signal processor 32. The network processor 30 receives data from the microwave backhaul radio unit 26 that has been demodulated and repackages the data in packets suitable for transmission via a cellular radio unit 22. The network processor 30 also receives data from the cellular radio unit 22 that has been demodulated and repackages the data in packets suitable for transmission via the microwave backhaul radio unit. The network processor 30 also provides packet data convergence protocol (PDCP) processing. The network processor 30 may also perform microwave backhaul facing transport functions that include security functions such as encryption and decryption, as well as optional compression.

The digital signal processor 32 may have two channels. A first channel is for processing cellular radio signals. The first channel includes cellular layer 1 (modulator/demodulator) 34, cellular layer 2 (scheduler) 36 and cellular layer 3 (radio link controller (RLC)) 38 functions. A second channel is for processing microwave backhaul radio signals. The second channel includes microwave layer 1 (modulator/demodulator) 40, microwave layer 2 (scheduler) 42 and microwave layer 3 (radio link controller (RLC)) 44 functions.

Note that the functions of the two channels are similar and share similar attributes. Thus, the digital signal processor 32 may be implemented by a processor that executes programmatic software, the software being shared by each channel. For example, the modulation functions for the microwave backhaul radio channel and the cellular radio channel may be the same or at least similar and can be performed by execution of a software module to perform functions common to each type of modulation. As another example, scheduling may be based on priority to achieve a particular quality of service for a call. At least some of the scheduling functions may be the same for both the cellular and microwave components, and therefore, some of the same software may be shared and executed by the same processor to perform the scheduling functions.

In an uplink direction, where information is received from a mobile device via a cellular remote radio unit 22, the information is transmitted through one of a plurality of ports 48 and through a switch 46 to the demodulator 34 of the digital signal processor 32 of the cellular baseband unit 20. The ports 48 may interchangeably coupled to one or more cellular radio units and to one or more microwave backhaul radio units.

The demodulator 34 of the digital signal processor 32 performs demodulation of signals received from the cellular radio unit 22, and passes the demodulated signals to the scheduler 36. The level of modulation may be based on a channel quality indicator that is measured for the cellular radio link. For example, a channel quality indicator may indicate use of a lower level of modulation when the channel quality is poor and may indicate use of a higher level of modulation when the channel quality is good.

The scheduler 36 receives the demodulated signals, and passes the scheduled signals to the RLC 38. The scheduler 36 schedules all uplink user equipment (UE) transmissions and provides grants to the UE on an accompanying downlink to achieve the scheduling of the uplink UE transmissions. The scheduler 36 also shares information with the microwave scheduler 42. For example, a priority of a call and/or a quality of service may be shared by both the scheduler 36 and the scheduler 42. For example, the scheduling performed by the schedulers 36 and 42 may include setting a priority for a call to achieve a particular quality of service (QOS) pursuant to a service level agreement (SLA) between an end user and a carrier.

The schedulers may also share time slot information concerning time slots assigned to information for transmission by the cellular radio and the microwave backhaul radio. For example, more time slots may be assigned to a call of higher priority than a number of time slots assigned to a call of lower priority. The schedulers may share information concerning a bandwidth assigned to information for transmission by the cellular radio and the microwave backhaul radio. For example, more bandwidth may be assigned to a call that is to receive a higher quality of service than the bandwidth assigned to a call that is to receive a lower quality of service.

The RLC 38 may perform header insertion, error correction, concatenation, segmentation and reassembly of data units of the received information, as known in the art. The RLC 38 transmits the received information to the network processor 30. The network processor 30 repackages the information in packets suitable for transmission via the microwave backhaul radio unit, and passes the packets to the microwave RLC 44.

The microwave RLC 44 may perform header insertion, error correction, concatenation, segmentation and reassembly of data units of the information to be transmitted. In the uplink, the microwave RLC 44 holds packets sent to it from the network processor for access by the scheduler 42.

The scheduler 42 receives the information from the RLC 44 and schedules the information for transmission. The scheduling may include setting a priority for a call to achieve a particular quality of service. The scheduler 42 also shares information with the scheduler 36, as described above.

The scheduled information from the scheduler 42 is modulated by the modulator 40. As explained above, the modulator 40 may share information concerning the modulation with the modulator 34. For example, the modulation level and type of modulation may be shared. Also, the modulation type and level implemented by the modulator 34 may be based on a channel quality of the microwave link. The modulated signal is routed through the switch 46 through a port 48 to the microwave backhaul radio unit 26, where it is transmitted by the antenna 28.

In the downlink direction, where information is received from the microwave backhaul radio unit 26, the information is transmitted through one of the ports 48 and the switch 46 to the demodulator 40 of the digital signal processor 32 of the cellular baseband unit 20. The demodulator 40 of the digital signal processor 32 performs demodulation of signals received from the microwave backhaul radio unit 22, and passes the demodulated signals to the scheduler 42. A particular level of modulation may be shared between the demodulator 40 and the demodulator 34. Thus, for example, the modulation type and level implemented by the modulator 34 may be based in part on the modulation type and level implemented by the modulator 40, and vice versa. Coordination of modulation types and levels may be performed by the schedulers 36 and 42, which have knowledge of the modulation types and levels implemented by the modulators 34 and 40. Further, the modulation and demodulation of each channel may be based on a channel quality indicator, as discussed above.

The scheduler 42 receives the demodulated signals, and passes the properly received signals to the RLC 44. The microwave scheduler 42 also shares information with the cellular scheduler 36. For example, the schedulers may share quality of service information and/or priority information. The scheduling performed by the schedulers 36 and 42 may include setting a priority for a call to achieve a particular quality of service (QOS) pursuant to a service level agreement (SLA) between an end user and a carrier. Other information that may be shared includes carrier frequency information, time slot resource information, power allocation, modulation and bandwidth information. For improperly received signals, scheduler 42 provides feedback over the microwave backhaul radio unit 26 that enables re-transmission.

The RLC 44 performs header insertion, error correction, concatenation, segmentation and reassembly of data units of the received information. The RLC 44 also shares information with the RLC 38, as described above. The RLC 42 transmits the received information to the network processor 30. The network processor 30 repackages the information in packets suitable for transmission via the cellular radio unit, and passes the packets to the cellular RLC 38. The RLC 38 performs cellular RLC related functions, including header insertion, error correction, concatenation, segmentation and reassembly of data units of the received information The network processor 30, also referred to herein as a packet processor, functions to reformat first signals from a first format of signals received from the microwave backhaul radio unit to a second format of signals transmitted by the cellular radio unit, and to reformat the second signals received from the cellular radio unit from the second format to the first format to be transmitted via the microwave backhaul radio. For example, the packet size and structure may be different for data transmitted by the cellular radio and data transmitted by the microwave backhaul radio.

The scheduler 36 receives the information from the RLC 38 and schedules the information for transmission. The scheduling may include setting a priority for a call to achieve a particular quality of service. The scheduling may also include assigning a bandwidth to a call to achieve the particular quality of service. The scheduler 36 may also share information with the scheduler 42. The scheduled information from the scheduler 36 is modulated by the modulator 34. The modulated signal is routed through the switch 46 through a port 48 to a cellular remote radio unit 22, where it is transmitted by an antenna 24.

Thus, in some embodiments, a cellular baseband unit includes a first scheduler and a second scheduler, which may be implemented in part by software executed by a digital signal processor. The first scheduler schedules signals to be transmitted and received by a cellular radio unit. A second scheduler schedules signals to be transmitted by a microwave backhaul radio unit. The first and second schedulers may share information concerning the respective signals to be transmitted by the cellular and microwave backhaul radio units. The information may include priority of a call, bandwidth, time slot assignment information and frequency assignment information.

In the embodiment shown in FIG. 2, substantial integration of functions of a microwave backhaul radio controller and a cellular radio controller is achieved. This integration enables use of a single digital signal processor for both microwave backhaul and cellular signal processing functions. Also, the same switch and a port of a cellular baseband unit that is used to connect a cellular radio unit can be used to connect the microwave backhaul radio unit as well.

Thus, in some embodiments, a single cellular baseband unit includes a first port in communication with a cellular radio unit and a second port in communication with a microwave backhaul radio unit. The single cellular baseband unit further includes a switch, which may be a cross-connect switch, in communication with the first port and the second port. The switch directs traffic to and from the cellular radio unit and to and from the microwave backhaul radio unit. The first port and/or the second port may be connected to their respective radios by any suitable arrangement, for example, optical fiber, electrical wire, and the like. The first and second port may be coupled to a common switch interface or separate switch interfaces. Further, the ports may be interchangeably coupled to the cellular radios and the microwave backhaul radios.

Further, components of the cellular baseband unit that perform cellular radio control functions may share the same power supply 50 and cooling system 52 with components of the cellular baseband unit that perform microwave radio control functions, as shown in FIG. 2.

Figure 3:
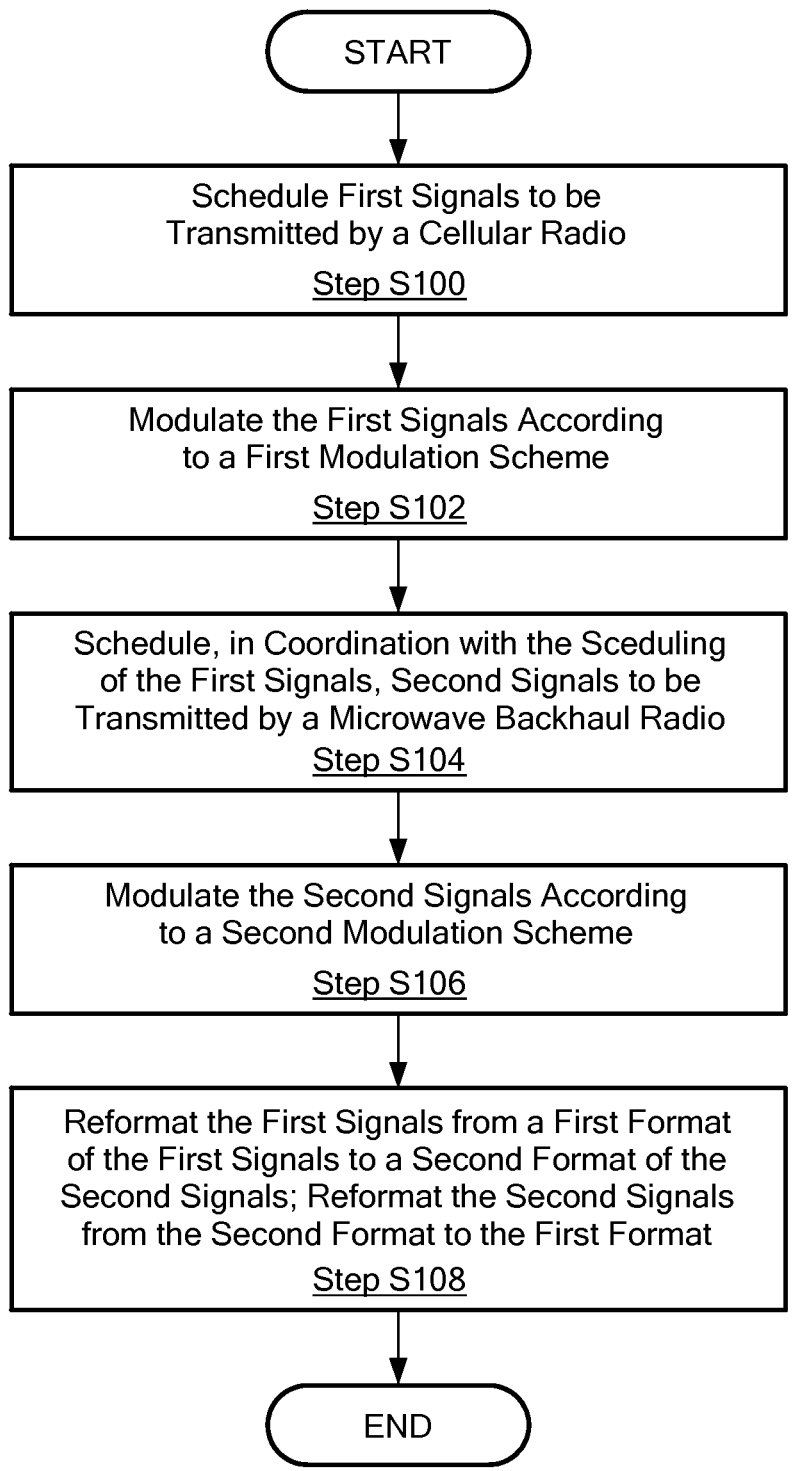
FIG. 3 is a flow chart of an exemplary process for implementing a cellular baseband unit according to principles of the present invention.

FIG. 3 is a flow chart of an exemplary process performed by a cellular baseband unit according to principles of the present invention. First signals to be transmitted by a cellular radio are scheduled for transmission (step S100). The first signals are modulated according to a first modulation scheme (step S102). In coordination with the scheduling of the first signals, second signals to be transmitted by a microwave backhaul radio are scheduled for transmission (step S104). Thus, for example, when first signals in a forward channel must be scheduled for transmission at a high priority, second signals of a reverse channel corresponding to the forward channel may be scheduled for transmission at the same high priority.

The second signals are modulated according to a second modulation scheme (step S106). The second modulation scheme may be related to or based on the first modulation scheme. In one embodiment, the level and type of modulation may be decided by joint operation of the schedulers 36 and 42, taking into account the current performance of the cellular and microwave links Prior to transmission, the first signals are reformatted from a first format to a second format and the second signals are reformatted from the second format to the first format (step S108).

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A wireless communication system, comprising:
   a cellular radio unit adapted to wirelessly communicate with a plurality of user units;
   a microwave backhaul radio unit adapted to wirelessly communicate with a telecommunications network; and
   a cellular baseband unit communicatively coupled to the cellular radio unit and to the microwave backhaul radio unit, the cellular baseband unit including:
      a digital signal processor, the digital signal processor configured to:
         provide a first layer modulation and demodulation for signals associated with the microwave backhaul radio unit and for signals associated with the cellular radio unit; and
         provide a second layer scheduling for the microwave backhaul radio unit and for the cellular radio unit.

2. The wireless communication system of claim 1, wherein the cellular baseband unit further comprises:
   a network processor in communication with the digital signal processor, the network processor configured to provide packet data convergence protocol (PDCP) processing and network packet termination for the cellular radio unit and the microwave backhaul radio unit.

3. The wireless communication system of claim 2, wherein the cellular baseband unit further includes a power supply, the power supply configured to provide power to the digital signal processor and the network processor.

4. The wireless communication system of claim 2, wherein the cellular baseband unit further includes a cooling system, the cooling system configured to cool the digital signal processor and the network processor.

5. The wireless communication system of claim 1, wherein the digital signal processor includes:
   a first scheduler, the first scheduler configured to schedule the signals associated with the cellular radio unit;
   a second scheduler, the second scheduler configured to schedule the signals associated with the microwave backhaul radio unit; and
   the first scheduler and the second scheduler configured to share information concerning scheduling of the signals associated with the cellular radio unit and of the signals associated with the microwave backhaul radio unit.

6. The wireless communication system of claim 1, wherein the cellular baseband unit further comprises:
   a first port in communication with the cellular radio unit;
   a second port in communication with the microwave backhaul radio unit; and
   a switch in communication with the first port and the second port, the switch configured to direct traffic to and from the cellular radio unit and to and from the microwave backhaul radio unit.

7. A cellular baseband unit, comprising:
   a first scheduler, the first scheduler configured to schedule first signals to be transmitted by a cellular radio;
   a first modulator, the first modulator configured to modulate the first signals according to a first modulation scheme;
   a second scheduler, operating in coordination with the first scheduler, the second scheduler configured to schedule second signals to be transmitted by a microwave backhaul radio;
   a second modulator, the second modulator configured to modulate the second signals according to a second modulation scheme; and
   a packet processor, the packet processor configured to reformat the first signals from a first format of signals received from the microwave backhaul radio to a second format of signals transmitted by the cellular radio, and to reformat the second signals from the second format to the first format.

8. The cellular baseband unit of claim 7, wherein the cellular baseband unit further includes a digital signal processor, the first scheduler and the second scheduler being part of the digital signal processor.

9. The cellular baseband unit of claim 7, further including a power supply, the power supply configured to supply power to the digital signal processor and the packet processor.

10. The cellular baseband unit of a claim 9, further including a cooling system, cooling system configured to cool the digital signal processor and the packet processor.

11. The cellular baseband unit of claim 7, wherein the first modulation scheme and the second modulation scheme are different.

12. The cellular baseband unit of claim 7, further comprising a cross-connect switch, the cross-connect switch configured to switch signals between the digital signal processor and the cellular radio, and to switch signals between the digital signal processor and the microwave backhaul radio.

13. The cellular baseband unit of claim 12, further comprising a first port coupling the cellular baseband unit to the cellular radio and a second port coupling the cellular baseband unit to the microwave backhaul radio, the first port and the second port being coupled to the cross-connect switch.

14. The cellular baseband unit of claim 13, wherein the first modulation scheme is based on a channel quality of a cellular radio link and the second modulation scheme is based on a channel quality of a microwave radio link.

15. The cellular baseband unit of claim 13, wherein the first port and the second port are coupled to a switching interface of the cellular baseband unit.

16. A wireless communication method, the method comprising:
   scheduling, at a cellular baseband unit, first signals received from a cellular radio for transmission by a microwave backhaul radio;
   providing, at the cellular baseband unit, a first layer modulation and demodulation for signals associated with the microwave backhaul radio and for signals associated with the cellular radio; and
   scheduling, at the cellular baseband unit, second signals received from the microwave backhaul radio, the scheduling of the first signals and the scheduling of the second signals being coordinated to achieve a predetermined quality of service for both the first signals and the second signals.

17. The wireless communication method of claim 16, wherein a single processor performs the scheduling of the first signals and the scheduling of the second signals.

18. The wireless communication method of claim 17, further comprising providing radio link control (RLC) at the cellular baseband unit for the first signals and the second signals.

19. The wireless communication method of claim 16, further comprising using a cross-connect switch of the cellular baseband unit to switch the first signals received from the cellular radio and to switch the second signals received from the microwave backhaul radio.

20. The wireless communication method of claim 16, further comprising using a local power supply within the cellular baseband unit to supply power for scheduling of the first signals and scheduling of the second signals.

* * * * *